Oct. 6, 1970 R. M. ROOD 3,532,836

AUXILIARY TELEPHONE SUPPORT

Filed Aug. 21, 1968

INVENTOR
ROBERT M. ROOD

BY Charles L. Johnson
ATTORNEY

United States Patent Office 3,532,836
Patented Oct. 6, 1970

3,532,836

AUXILIARY TELEPHONE SUPPORT

Robert M. Rood, 3225 Victoria Road, St. Paul, Minn. 55119

Filed Aug. 21, 1968, Ser. No. 754,224
Int. Cl. H04m *1/04*
U.S. Cl. 179—146 7 Claims

ABSTRACT OF THE DISCLOSURE

This invention relates to an auxiliary telephone support adapted to be utilized in conjunction wtih a wall telephone. A unitary molded support is shown having means for gripping a portion of the wall telephone, and having means for removably attaching to the side of the wall telephone, thereby being mountable without requiring modification of the telephone.

BACKGROUND OF THE INVENTION

1. Filed of the invention

This invention relates generally to auxiliary devices that can be utilized with telephone sets. More specifically, it relates to those devices that are utilized as auxiliary hangers for use in conjunction with wall telephones.

2. Description of the prior art

There are generally two types of telephone sets in use today. The desk telephone is intended to rest on some smooth surface, and the wall-mounted telephone is generally secured to a wall or other vertical support. It is particularly for the latter type of telephone that this invention was made. It is often the case that the person called is not the person that answers. It becomes necessary for the answering party to let the hand set dangle by its cord, or to try to lay it on the rounded surface of the wall set, while going to summon the called party. Often the handset slips and either mars the wall, or damages the equipment, as a result of the drop. The prior art has seen several types of auxiliary hand-set supports, or hangers, that are to be used with wall-mounted telephones. These prior art devices have many disadvantages. A primary disadvantage of one class of such auxiliary hangers is that they require the wall-mounted telephone to have a space between its back portion and the wall that mounts the set. This space is commonly uesd for an engaging member to slip between the telephone and the wall and secure the auxiliary hanger in place. A well-hung telephone will not have such a space. Further, devices of this type tend to mar the wall surface when being mounted. Yet another class of auxiliary hangers has the common problem that they require some form of attachment directly to the wall. The attachment can be in the form of a screw or nail mounting to the wall. This has the disadvantage of leaving undesirable holes in the wall, and has the common problem of tending to loosen up with use. Yet another type of auxiliary telephone hanger of the prior art relies on a construction of the case of the telephone having apertures therein at the side, for receiving hook members for supporting the auxiliary hanger. An examination of modern-day wall telephones will quickly indicate that such apertures are no longer present in the plastic-like covers. Yet another disadvantage of the prior art devices is the mode of construction from a plurality of separate parts. The various parts are fabricated and must then be assembled, providing an expensive manufacturing process. Some of the prior art devices have even required modification of the telephone case. It is to the foregoing types of problems in the prior art that the subject invention is directed.

SUMMARY

The improved auxiliary telephone support of the present invention overcomes and provides marked advantages over the several disadvantages of the prior art hangers. The improved auxiliary telephone support of this invention comprises a unitary structure having a pair of spaced-apart members for engaging the earpiece of the telephone set, and having a first curved support member having a hook member for engaging a ridge at the top of the wall-mounted telephone set and having a second support member downwardly extending and having means attached thereto for adhering to the side of the wall-mounted telephone set. Such a structure attends itself to all of the problems of the prior art and overcomes them. With the subject invention, there is no need for the wall-mounted telephone set to be separated from the wall. Neither is there any requirement that there be special apertures or openings in the telephone set. Further, there is no necessity of providing any mounting equipment for means for attaching the auxiliary hanger to the wall. Finally, the device is of a unitary structure and can be molded, thereby providing an extremely inexpensive manufacturing process.

In view of the foregoing, it is a primary object of this invention to provide an improved auxiliary telephone support device for use with a wall-mounted telephone set. Yet another object of this invention is to provide an auxiliary telephone support that is of a unitary structure that does not require expensive manufacturing processes. Still a further object of this invention is to provide an improved auxiliary telephone support that can be removably mounted on a wall-mounted telephone set without requiring means for mounting to the wall or special apertures in the telephone set.

BRIEF DESCRIPTION OF THE DRAWINGS

The foregoing and other more detailed and specific objectives will be disclosed in the course of the following specification, with reference being made to the accompanying drawings in which.

DESCRIPTION OF THE PREFERRED EMBODIMENT

Figure 1:
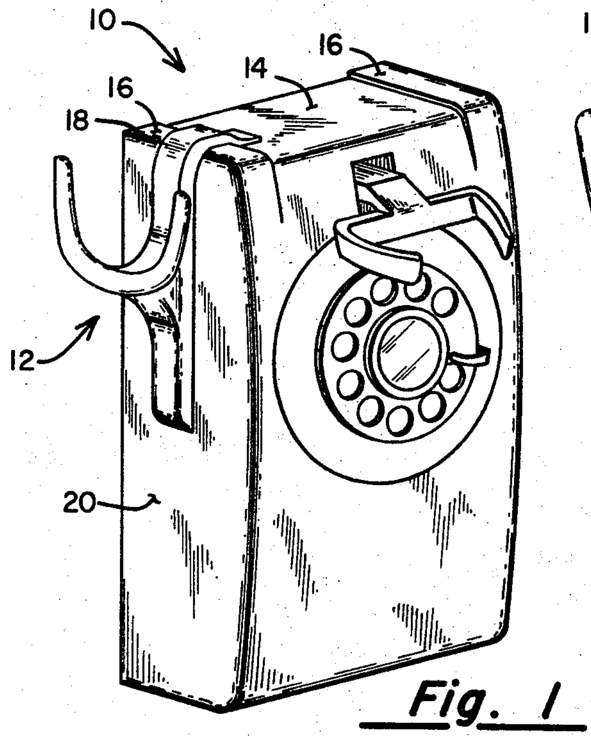
FIG. 1 is a diagramatic representation of a wall-mounted telephone having an auxiliary telephone support of the instant invention mounted thereon.

FIG. 1 is a diagramatic view of a wall-mounted telephone set, referred to generally as 10, having an auxiliary telephone support device, referred to generally as 12, mounted thereon. The top surface 14 of the telephone set 10, normally has ridge members 16. A common material for the case is a plastic-like material having a smooth surface. The juncture 18 where the top of the ridge 16 meets the wall portion 20, is normally rounded, with the side portion 20 being generally flat over an extended portion thereof.

Like elements of the auxiliary telephone support that are shown in the various figures will be referred to with like reference numerals.

Figure 2:
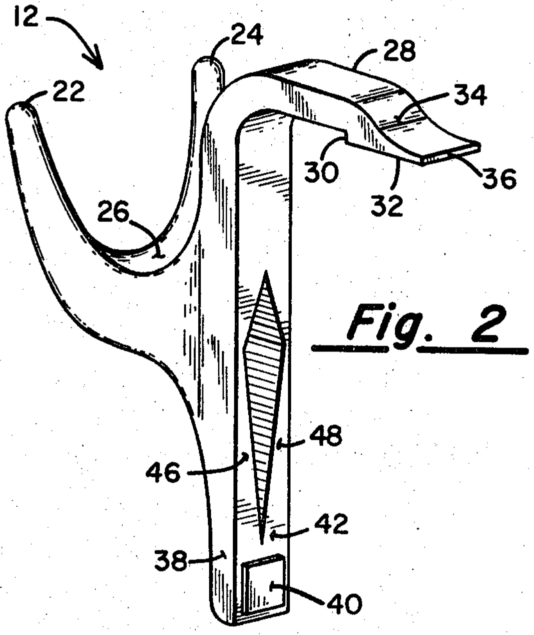
FIG. 2 is a diagramatic view of the improved auxiliary telephone support of this invention.

FIG. 2 illustrates a diagrammatic view of the subject invention. A pair of spaced-apart projections 22 and 24 are integrally molded to a curved support member 26. Projections 22 and 24 are spaced apart far enough to receive the handle portion of a telephone handset between them, but are close enough together to engage and hold the earpiece on support surface 26. At the upper end of the support 12, is located a member 28. Member 28 has a downwardly extending surface 30 for engaging the ridge member 16. The under surface 32 is adapted to rest on the upper surface 14 of the telephone. The upper surface 34 is downwardly extending with the foremost edge 36 being of a substantially thin dimension, so that it tends to blend toward the upper surface 14 of the telephone set. A downwardly extending member 38 rests against the side 20 of the telephone 10. Toward the lower extremity, there is mounted a nonhardening and non-drying adhesive material 40, that engages the side 20 when the auxiliary telephone support is in place, and holds it removably attached thereto.

Figures 3, 4:
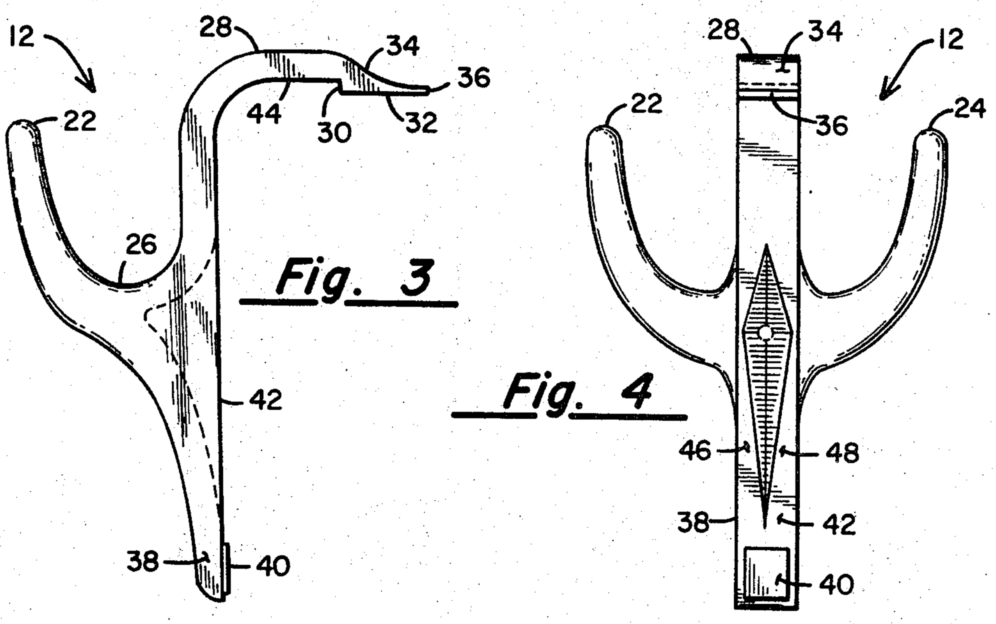
FIG. 3 is a side view of the instant invention.
FIG. 4 is a front view of the instant invention.

FIG. 3 is a side view of the improved auxiliary telephone support and illustrates the contour of the upper member 28 and the lower member 38. It can be seen that a downwardly extending surface 42 on the device is so made that the surface 42 and the surface 44 are at less than a 90° angle. The dimension of the curved surface joining 42 and 44 is made to substantially conform to that portion of the telephone set 10 engaged. With surface 42 being at less than a 90° angle to this upper member, downwardly extending member 38 is forced outwardly when the device is placed on the telephone set. This outward pressure tends to force member 38 outwardly holding a pressure on the adhering material 40 and holds surface 30 tightly against the edge of ridge 16, thereby tending to hold the support 12 securely in place.

The internal portion of the support 12 is molded out hollow. This provides a pair of substantially parallelly arranged walls 46 and 48. These walls, 46 and 48, act as rib members and provide resilient support for downwardly extending portion 38. Referring briefly to FIG. 4, which is a front view of the improved telephone support 12, it can be seen that these walls 46 and 48 extend upwardly toward the curved portion joining surface 44. Hollowing out of this portion of the support 12 results in a savings in material; provides a lighter weight for the device; and, most importantly, provides the rib effect for providing the resiliency for member 38.

Figure 5:
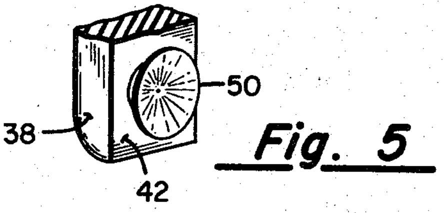
FIG. 5 illustrates an alternative suction-cup mounting for use in place of the adhesive material or the mounting catch.

FIG. 5 is a broken-away view of downwardly extending portion 38, and illustrates a suction-cup member 50 mounted in the surface 42. The suction-cup member 50 in an alternative to removable adhering material 40, that will also hold the lower end of support 12 firmly against the side 20.

For those wall-mounted telephones 10 that do not have ridges 16, a suction-cup member, such as that shown in FIG. 5, can replace the holding action of retaining surface 30, by being mounted in surface 32, and can thereby mount the support 12 to the upper surface 14 also. The curved, or inwardly extending, relationship of member 38 to member 28 will cause pressure to be exerted on both the lower and upper surface engaging devices.

It is of course clear that other engaging devices can be utilized for special types of telephones, for instance magnetic retaining devices can be utilized for those telephone cases that are constructed of a metallic material.

The preferred embodiment is molded from a plastic material by techniques well-known in the plastic molding art, thereby achieving the inexpensive unitary structure. The support can be molded from plastics of different colors to match the colors of modern-day telephones, thereby providing a device that is attractive as well as extremely functional.

From the foregoing, it can be seen that the various purposes and objectives of the invention have been achieved. An inexpensive unitary auxiliary telephone supporting structure has been disclosed that will cooperate with a wall-mounted telephone set by engaging a rib member on the telephone set at one end while adhering to the wall of the telephone set at the other. Clearly no modification to either the mounting wall, or the wall-mounted telephone set is required. Further, the device is symmetrical and can be utilized at either side of the telephone set.

Various modifications will become apparent to those skilled in the art without departing from the spirit and scope of this invention. While the preferred embodiment of this invention has been illustrated and described, it will be understood that these are by way of illustration only, and that various changes or modifications may be made within the contemplation of the invention. Therefore, what is intended to be protected by Letters Patent is defined in the appended claims.

What is claimed is:

1. A auxiliary support for telephone handsets adapted for use with wall-mounted telephone comprising:

curved support means for supporting the earpiece of a telephone handset;

spaced-apart projection means for receiving the handle portion of said handset therebetween and retaining said earpiece of said handset on said curved support means, said spaced-apart projection means integrally formed with said curved support means;

upwardly extending means for extending upwardly along a side of said wall-mounted telephone set, said upwardly extending means integrally formed with said curved support means;

first retaining means for removably engaging the top of said wall-mounted telephone set, said retaining means integrally formed with said upwardly extending means;

downwardly extending means for extending downwardly along said side of said wall-mounted telephone set, said downwardly extending means integrally formed with said curved support means; and second retaining means mounted on said downwardly extending means for removably engaging said side of said wall-mounted telephone set.

2. An auxiliary support as in claim 1 wherein said first retaining means includes hook means for engaging a rib on said top of said wall-mounted telephone.

3. An auxiliary support as in claim 2 wherein said hook means includes a first surface for resting on said top of said wall-moutned telephone, and a second surface substantially perpendicular to said first surface for removably engaging said rib.

4. An auxiliary support as in claim 1 wherein said first retaining means and said downwardly extending means are formed at a predetermined angle less than ninety degrees for holding tension on said first and second retaining means.

5. An auxiliary support as in claim 1 wherein said second retaining means includes nonhardening adhesive means for removably adhering to said side of said wall-mounted telephone set.

6. An auxiliary support as in claim 1 wherein said second retaining means comprises a suction-cup means for removably engaging said side of said wall-mounted telephone set.

7. An auxiliary support as in claim 1 wherein said downwardly extending means includes spaced-apart wall members integrally formed together and to said curved support means, said spaced-apart wall members integrally joined along a portion thereof by mounting-surface means for mounting said second retaining means.

References Cited

UNITED STATES PATENTS

| | | | |
|---|---|---|---|
| 1,935,912 | 11/1933 | Obergfell | 179—100 |
| 2,686,848 | 8/1954 | Wicknick | 179—146 |
| 3,209,085 | 9/1965 | Farina | 179—146 |

WILLIAM C. COOPER, Primary Examiner